(12) United States Patent
Park et al.

(10) Patent No.: US 9,160,197 B2
(45) Date of Patent: *Oct. 13, 2015

(54) APPARATUS FOR GENERATING AND STORING ELECTRIC ENERGY

(75) Inventors: Young-jun Park, Suwon-si (KR); Jong-min Kim, Yongin-si (KR); Joon-ho Bae, Suwon-si (KR); Zhong-lin Wang, Atlanta, GA (US)

(73) Assignees: SAMSUNG ELECTRONICS CO., LTD., Suwon-si (KR); GEORGIA TECH RESEARCH CORPORATION, Atlanta, GA (US)

( * ) Notice: Subject to any disclaimer, the term of this patent is extended or adjusted under 35 U.S.C. 154(b) by 540 days.

This patent is subject to a terminal disclaimer.

(21) Appl. No.: 13/537,924

(22) Filed: Jun. 29, 2012

(65) Prior Publication Data

US 2013/0162192 A1 Jun. 27, 2013

(30) Foreign Application Priority Data

Dec. 23, 2011 (KR) ........................ 10-2011-0141728

(51) Int. Cl.
*H02J 7/00* (2006.01)
*H02J 7/32* (2006.01)
*H01S 3/067* (2006.01)
*B82Y 30/00* (2011.01)
*H02J 7/34* (2006.01)
*H02J 7/35* (2006.01)

(52) U.S. Cl.
CPC .. *H02J 7/32* (2013.01); *B82Y 30/00* (2013.01); *H01S 3/06716* (2013.01); *H02J 7/345* (2013.01); *H02J 7/35* (2013.01)

(58) Field of Classification Search
CPC ............... H02J 7/32; H02J 7/35; H02J 7/345; H01S 3/06716
USPC .................................. 320/101, 130, 134, 167
See application file for complete search history.

(56) References Cited

U.S. PATENT DOCUMENTS

| | | | | |
|---|---|---|---|---|
| 6,807,853 | B2 * | 10/2004 | Adamson et al. ................ | 73/146 |
| 7,663,863 | B2 * | 2/2010 | Maruyama et al. ........... | 361/502 |
| 7,705,523 | B2 | 4/2010 | Wang et al. | |
| 7,898,789 | B1 * | 3/2011 | Jarvinen ........................ | 361/218 |
| 8,580,418 | B2 * | 11/2013 | Istvan ............................. | 429/129 |
| 8,664,523 | B2 * | 3/2014 | Wang et al. ................... | 136/259 |
| 8,669,325 | B1 * | 3/2014 | Hyman .......................... | 524/609 |

(Continued)

FOREIGN PATENT DOCUMENTS

| | | |
|---|---|---|
| KR | 1996-0024300 A | 7/1996 |
| KR | 10-2000-0032475 A | 6/2000 |

(Continued)

OTHER PUBLICATIONS

Zhang et al.; "Fabrication and characterisation of energy storage fibres"; Publication Year: 2014; Automation and Computing (ICAC), 2014 20th International Conference on; pp. 228-230.*

(Continued)

*Primary Examiner* — Helen Rossoshek
(74) *Attorney, Agent, or Firm* — Sughrue Mion, PLLC

(57) ABSTRACT

An apparatus for generating and storing electric energy, the apparatus including a fiber, an electric energy generation unit disposed on the fiber, and an electric energy storage unit disposed on the fiber.

27 Claims, 14 Drawing Sheets

(56) References Cited

U.S. PATENT DOCUMENTS

| | | | |
|---|---|---|---|
| 8,803,406 B2* | 8/2014 | Lee et al. | 310/339 |
| 2002/0142202 A1* | 10/2002 | Li et al. | 429/27 |
| 2004/0041536 A1* | 3/2004 | Matsubara et al. | 320/106 |
| 2007/0108867 A1* | 5/2007 | Saloka et al. | 310/311 |
| 2007/0243124 A1* | 10/2007 | Baughman et al. | 423/447.1 |
| 2007/0257634 A1* | 11/2007 | Leschin et al. | 320/107 |
| 2008/0170982 A1* | 7/2008 | Zhang et al. | 423/447.3 |
| 2008/0236652 A1* | 10/2008 | Defries et al. | 136/248 |
| 2008/0252174 A1* | 10/2008 | Mohammadi et al. | 310/319 |
| 2009/0146604 A1* | 6/2009 | Choi et al. | 320/101 |
| 2010/0258160 A1* | 10/2010 | Wang et al. | 136/246 |
| 2011/0224330 A1 | 9/2011 | Sodano et al. | |
| 2011/0235241 A1* | 9/2011 | Park et al. | 361/502 |
| 2012/0148921 A1* | 6/2012 | Lee et al. | 429/231.7 |
| 2012/0176237 A1* | 7/2012 | Tabe | 340/539.12 |
| 2013/0162216 A1* | 6/2013 | Zhamu et al. | 320/130 |
| 2014/0042988 A1* | 2/2014 | Kuttipillai | 320/167 |
| 2014/0203783 A1* | 7/2014 | Kiesel et al. | 320/134 |

FOREIGN PATENT DOCUMENTS

| | | |
|---|---|---|
| KR | 10-2000-0053296 A | 8/2000 |
| KR | 10-2005-0011781 A | 1/2005 |
| KR | 10-2007-0010740 A | 1/2007 |
| KR | 10-0729152 B1 | 6/2007 |
| KR | 10-1040956 B1 | 6/2011 |
| KR | 10-1095792 B1 | 12/2011 |

OTHER PUBLICATIONS

Joonho Bae, et al., "Single-Fiber-Based Hybridization of Energy Converters and Storage Units Using Graphene as Electrodes," wileyonlinelibrary.com, Advanced Matters 2011, pp. 3446-3449, 23.

* cited by examiner

US 9,160,197 B2

APPARATUS FOR GENERATING AND STORING ELECTRIC ENERGY

CROSS-REFERENCE TO RELATED APPLICATION

This application claims priority from Korean Patent Application No. 10-2011-0141728, filed on Dec. 23, 2011, in the Korean Intellectual Property Office, the disclosure of which is incorporated herein in its entirety by reference.

BACKGROUND

1. Field

Apparatuses consistent with exemplary embodiments relate to apparatuses for generating and storing electric energy, and more particularly, to an apparatus for generating and storing electric energy in which an electric energy generation unit and an electric energy storage unit are disposed on a flexible fiber.

2. Description of the Related Art

Typical electric energy generating devices designed on a hard material have low flexibility and thus it is difficult to use them together with flexible electronic devices and it is also difficult to use them in electronic devices that require small sizes and light weights. Recently, a technology for harvesting energy has drawn attention. Devices for harvesting energy by using such a technology may be new environmentally-friendly energy generating devices capable of converting solar energy or mechanical energy generated from a motion of a human body or micro vibration that exists in the environment into electric energy and collecting the electric energy. In addition, research on flexible and stretchable apparatuses for generating and storing energy by using a nanosystem capable of gathering electric energy from the environment thanks to advances in nanotechnology has recently been conducted.

SUMMARY

One or more exemplary embodiments may provide apparatuses for generating and storing electric energy in which an electric energy generation unit and an electric energy storage unit are disposed on a flexible fiber.

Additional exemplary aspects will be set forth in part in the description which follows and, in part, will be apparent from the description, or may be learned by practice of the presented embodiments.

According to an aspect of an exemplary embodiment, an apparatus for generating and storing electric energy includes a fiber; an electric energy generation unit disposed on the fiber; and an electric energy storage unit disposed on the fiber.

The electric energy generation unit may include at least one of a piezoelectric generator and a dye-sensitized solar cell (DSSC), and the electric energy storage unit may include a supercapacitor.

The piezoelectric generator may include a first electrode formed on a surface of the fiber, a plurality of nanowires that are formed on the first electrode and include an oxide semiconductor having piezoelectric characteristics, and a second electrode that surrounds the nanowires. In this regard, an end of each of the nanowires of the piezoelectric generator may form a Schottky contact with the second electrode. The piezoelectric generator may further include a third electrode formed on the second electrode, a plurality of nanowires formed on the third electrode, and a fourth electrode that surrounds the nanowires.

The DSSC may include a first electrode formed on the surface of the fiber, a plurality of nanowires that are formed on the first electrode and include an oxide semiconductor, a photosensitive dye disposed between the nanowires, a second electrode that surrounds the nanowires, and an electrolyte that fills a space between the first electrode and the second electrode. In this regard, a plurality of nanowires may be further formed between the first electrode and the second electrode. The DSSC may further include a third electrode formed on the second electrode, a plurality of nanowires formed on the third electrode, a photosensitive dye disposed between the nanowires, a fourth electrode that surrounds the nanowires, and an electrolyte that fills a space between the third electrode and the fourth electrode.

The supercapacitor may include a first electrode formed on the surface of the fiber, a plurality of nanowires that are formed on the first electrode and include an oxide semiconductor, a second electrode that surrounds the nanowires, and an electrolyte that fills a space between the nanowires and the second electrode. The supercapacitor may further include a third electrode formed on the second electrode, a plurality of nanowires formed on the third electrode, a fourth electrode that surrounds the nanowires, and an electrolyte that fills a space between the nanowires and the fourth electrode.

The first electrode of the piezoelectric generator, the first electrode of the DSSC, and the first electrode of the supercapacitor may be electrically connected to one another to form a common electrode. Alternatively, the first electrode of the piezoelectric generator, the first electrode of the DSSC, and the first electrode of the supercapacitor may be electrically disconnected from one another.

The first electrode of the piezoelectric generator, the first electrode of the DSSC, and the first electrode of the supercapacitor each may include a metal material.

The second electrode of the piezoelectric generator, the second electrode of the DSSC, and the second electrode of the supercapacitor each may include one of graphene, carbon nanotubes (CNTs), and metal nanowires. Each of the second electrode of the piezoelectric generator, the second electrode of the DSSC, and the second electrode of the supercapacitor may be directly coated or wound in the form of a film on the nanowires.

The nanowires may include a metal oxide or a semiconductor material having piezoelectric characteristics. The nanowires may be radially arranged. The fiber may include a flexible material. A plurality of the fibers may be connected to one another or weaved in the form of fabric.

According to an aspect of another exemplary embodiment, an apparatus for generating and storing electric energy includes a fiber; an electric energy storage unit disposed on the fiber; and an electric energy generation unit disposed on the electric energy storage unit.

The electric energy storage unit may include a supercapacitor, and the electric energy generation unit may include at least one of a piezoelectric generator and a DSSC.

The supercapacitor may include a first electrode formed on a surface of the fiber, a plurality of nanowires formed on the first electrode, a second electrode that surrounds the nanowires, and an electrolyte that fills a space between the nanowires and the second electrode.

The piezoelectric generator may include a first electrode formed on the second electrode of the supercapacitor, a plurality of nanowires formed on the first electrode, and a second electrode that surrounds the nanowires.

The DSSC may include a first electrode formed on the second electrode of the supercapacitor, a plurality of nanowires formed on the first electrode, a photosensitive dye disposed between the nanowires, a second electrode that surrounds the nanowires, and an electrolyte that fills a space between the first electrode and the second electrode.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
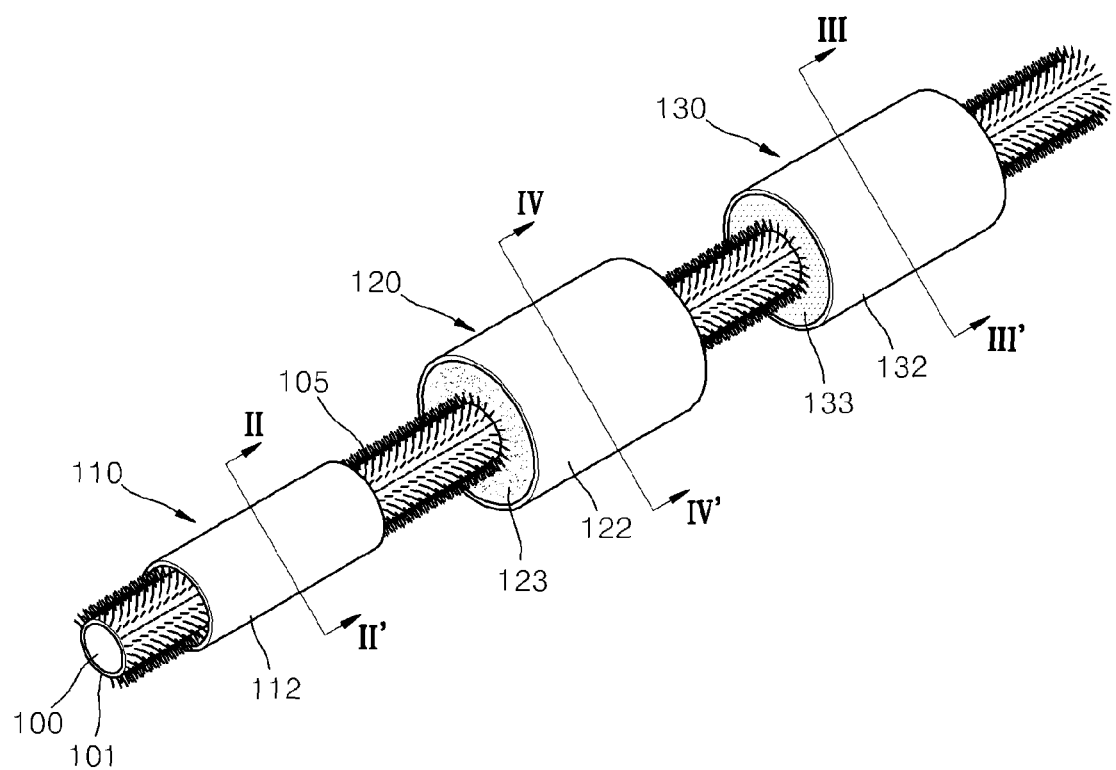
FIG. 1 is a perspective view of an apparatus for generating and storing electric energy, according to an exemplary embodiment.

Reference will now be made in detail to exemplary embodiments which are illustrated in the accompanying drawings, wherein like reference numerals refer to like elements throughout and the size and thickness of each element may be exaggerated for clarity. In this regard, the presented exemplary embodiments may have different forms and should not be construed as being limited to the descriptions set forth herein. Expressions such as "at least one of," when preceding a list of elements, modify the entire list of elements and do not modify the individual elements of the list.

Figure 2:
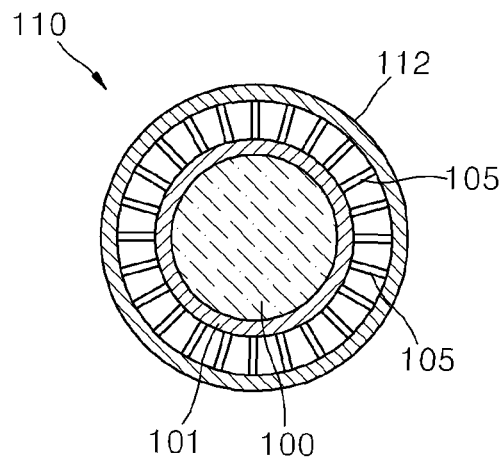
FIG. 2 is a cross-sectional view taken along a line II-II' of FIG. 1, according to an exemplary embodiment.
Figure 3:
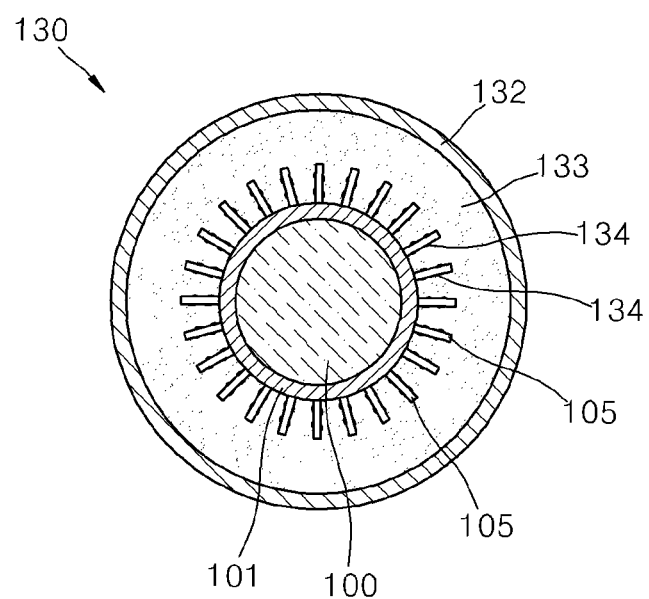
FIG. 3 is a cross-sectional view taken along a line III-III' of FIG. 1, according to an exemplary embodiment.
Figure 4:
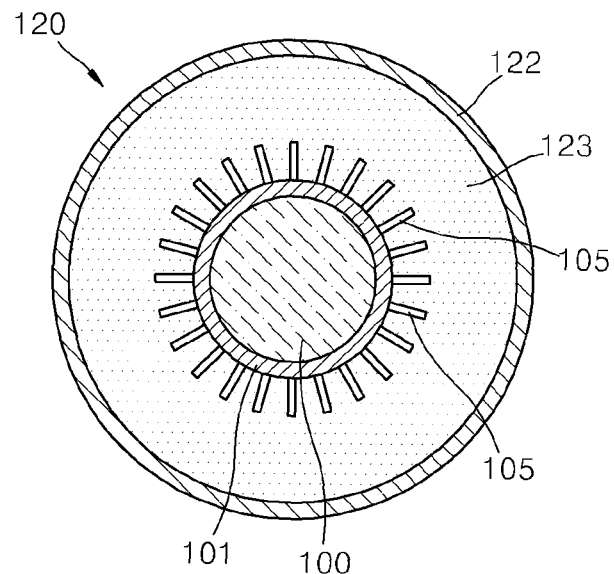
FIG. 4 is a cross-sectional view taken along a line IV-IV' of FIG. 1, according to an exemplary embodiment.

FIG. 1 is a perspective view of an apparatus for generating and storing electric energy, according to an exemplary embodiment. FIG. 2 is a cross-sectional view taken along a line II-II' of FIG. 1, according to an embodiment. FIG. 3 is a cross-sectional view taken along a line III-III' of FIG. 1, according to an embodiment. FIG. 4 is a cross-sectional view taken along a line IV-IV' of FIG. 1, according to an embodiment.

Referring to FIGS. 1 through 4, the apparatus includes a fiber 100, an electric energy generation unit disposed on the fiber 100, and an electric energy storage unit disposed on the fiber 100. The electric energy generation unit includes a piezoelectric generator 110 and a dye-sensitized solar cell (DSSC) 130, and the electric energy storage unit includes a supercapacitor 120.

The fiber 100 may include a flexible material. The fiber 100 may be formed of a resin such as polymethylmethacrylate (PMMA), but is not limited thereto. The fiber 100 may include various materials. The fiber may have a diameter of micrometers, but is not limited thereto.

The piezoelectric generator 110 includes a first electrode 101 formed on a surface of the fiber 100, a plurality of nanowires 105 formed on the first electrode 101, and a second electrode 112 that surrounds the nanowires 105. The first electrode 101 may include, for example, a highly conductive metal material such as Au, but is not limited thereto. The first electrode 101 of the piezoelectric generator 110 may also form a part of the DSSC 130 and the supercapacitor 120 as a common electrode and act as a seed layer for growing the nanowires 105, which will be described below. The first electrode 101 may be formed by depositing a highly conductive metal material on the surface of the fiber 100. The nanowires 105 may be formed of a metal oxide or a semiconductor material having piezoelectric characteristics. For example, the nanowires 105 may include ZnO, but are not limited thereto. The nanowires 105 may be formed on the first electrode 101 vertically or inclined at a certain angle. Also, the nanowires 105 may be radially arranged on the fiber 100, but are not limited thereto. The nanowires 105 may be arranged in other configurations. The nanowires 105 may be grown on the first electrode 101 by hydrothermal synthesis or chemical vapor deposition (CVD).

The second electrode 112 surrounds the nanowires 105. Thus, the second electrode 112 may have a cylindrical shape. The second electrode 112 may include, for example, graphene. Graphene is a very thin flat layer of carbon atoms that are two-dimensionally connected to one another. Graphene has high electrical conductivity and excellent thermal properties, and is chemically stable. Graphene may be synthesized by CVD using a transition metal such as nickel, copper, or the like as a catalyst or may be obtained by peeling layers of graphite one at a time. Graphene may be formed in a single layer or may have a multi-layered structure, and is generally in the form of a sheet. The second electrode 112 may be formed such that a graphene sheet surrounds the nanowires 105 formed on the fiber 100. The second electrode 112 may include only a graphene layer or a graphene layer formed on a catalyst metal substrate. Examples of a material for forming the second electrode 112 include, other than graphene, carbon nanotubes (CNTs) having a network structure, metal nanowires having a network structure, and a metal thin film. The second electrode 112 may be directly coated or wound in the form of a film on the nanowires 105.

In the piezoelectric generator 110, an end of each nanowire 105 needs to form a Schottky contact with the second electrode 112. When the nanowires 105 and the second electrode 112 are formed of, for example, ZnO and graphene, respectively, the graphene has a work function of about 4.4 to about 4.7 eV, and ZnO has an electron affinity of about 4.1 to about 4.35 eV. Thus, a Schottky contact may be formed at a contact surface between the second electrode 112 formed of graphene and the nanowires 105 formed of ZnO.

When a mechanical force such as external vibration, friction, noise, or pressure is applied to the piezoelectric generator 110 having the structure described above, the nanowires 105 formed of an oxide semiconductor having piezoelectric characteristics are deformed. Due to the deformation of the nanowires 105, a potential difference between two terminals of each nanowire 105 occurs, thereby obtaining electric energy.

Figure 5:
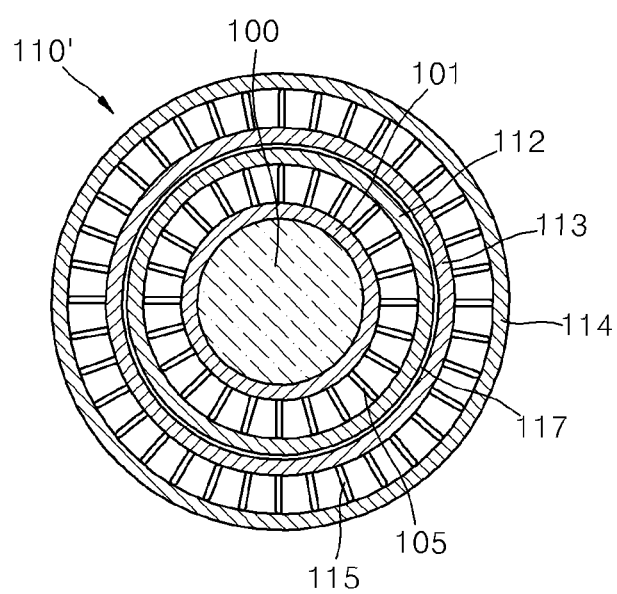
FIG. 5 is a view of a piezoelectric generator of the apparatus of FIG. 2, according to another exemplary embodiment.

FIG. 5 is a view of a piezoelectric generator 110' of the apparatus of FIG. 2, having a stacked structure in which two elements are stacked, according to another exemplary embodiment. Referring to FIG. 5, a third electrode 113 surrounds the second electrode 112, and nanowires 115 are radially disposed on the third electrode 113. A fourth electrode 114 surrounds the nanowires 115. An insulating layer 117 may be disposed between the second electrode 112 and the third electrode 113. Although not illustrated in FIG. 5, the second electrode 112 and the third electrode 113 may be integrally formed so as to form a common electrode. In FIG. 5, the piezoelectric generator 110' having a stacked structure in which two elements are stacked is illustrated. However, the piezoelectric generator 110' may have a stacked structure in which at least three elements are stacked.

The DSSC 130 includes the first electrode 101 formed on the surface of the fiber 100, a plurality of the nanowires 105 formed on the first electrode 101, a photosensitive dye disposed between the nanowires 105 on the first electrode 101, a second electrode 132 that surrounds the nanowires 105, and an electrolyte 133 that fills a space between the first electrode 101 and the second electrode 132. The first electrode 101 may include a highly conductive metal material such as Au, but is not limited thereto. The first electrode 101 of the DSSC 130 may be electrically connected to the first electrode 101 of the piezoelectric generator 110 so as to form a common electrode. The nanowires 105 may consist of a metal oxide or a semiconductor material having piezoelectric characteristics. In this regard, the nanowires 105 may act as a photo anode of the DSSC 130. The nanowires 105 may be formed of the same material as that of the nanowires 105 of the piezoelectric generator 110. That is, the nanowires 105 of the DSSC 130 may include, for example, ZnO. The nanowires 105 may be formed on the first electrode 101 vertically, may be inclined at a certain angle, or may be radially disposed on the fiber 100, but are not limited thereto. The photosensitive dye is formed between the nanowires 105. Accordingly, dye molecules 134 may be adsorbed onto surfaces of the nanowires 105. The photosensitive dye may be a photosensitive dye (for example, N719 dye) that is generally used in a DSSC. The second electrode 132 surrounds the nanowires 105 and may consist of a transmissive conductive material. The second electrode 132 may be formed of the same material as the second electrode 112 of the piezoelectric generator 110, e.g., graphene. As described above, graphene has high electrical conductivity, excellent thermal properties, and high transmittance. Although not illustrated in FIG. 3, a plurality of nanowires (not shown) may be formed on the second electrode 132 that faces the first electrode 101. In this case, the nanowires (not shown) may include ZnO. The nanowires (not shown) may be grown on the second electrode 132 formed of graphene. Examples of a material for forming the second electrode 132 include, other than graphene, other conductive materials, for example, CNTs having a network structure, metal nanowires having a network structure, and a metal thin film. The second electrode 132 may be directly coated or wound in the form of a film on the nanowires 105.

The electrolyte 133 may be filled between the first electrode 101 and the second electrode 132. The electrolyte 133 may be an electrolyte that is used in a general DSSC, for example, a liquid electrolyte containing 0.5 M LiI, 50 mM I2, and 0.5 M 4-terbutylpyridine in 3-methoxypropionitrile. The electrolyte 133 filled between the first electrode 131 and the second electrode 132 may be sealed by a sealing member (not shown).

In the DSSC 130 having the above-stated structure, when sunlight is transmitted through the second electrode 132, which is transparent, and is incident on the photosensitive dye, electrons are released from the dye molecules 134, and the released electrons flow toward the second electrode 132 through the nanowires 105, and thus electric energy is obtained. Meanwhile, the nanowires 105 may be formed on the second electrode 132 or on both the first electrode 101 and the second electrode 132.

Figure 6:
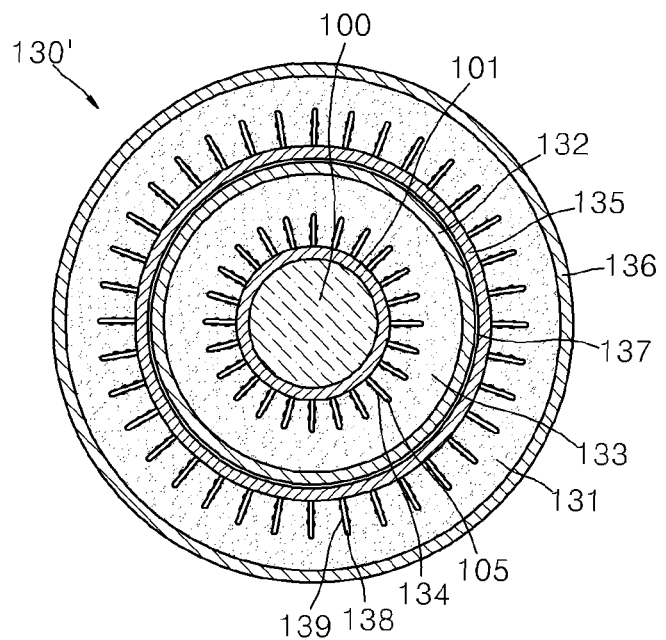
FIG. 6 is a view of a dye-sensitized solar cell (DSSC) of the apparatus of FIG. 3, according to another exemplary embodiment.

FIG. 6 is a view of a DSSC 130' of the apparatus of FIG. 3, having a stack structure in which two elements are stacked, according to another exemplary embodiment. Referring to FIG. 6, a third electrode 135 surrounds the second electrode 132, nanowires 138 are radially arranged on the third electrode 135, and a fourth electrode 136 surrounds the nanowires 138. A photosensitive dye including dye molecules 139 is disposed between the nanowires 138 on the third electrode 135, and an electrolyte 131 is filled between the third electrode 135 and the fourth electrode 136. An insulating layer 137 may be disposed between the second electrode 132 and the third electrode 135. Although not illustrated in FIG. 6, the second electrode 132 and the third electrode 135 may be integrally formed so as to form a common electrode. In FIG. 6, the DSSC 130' having a stacked structure in which two elements are stacked is illustrated. However, the DSSC 130' may have a stacked structure in which at least three elements are stacked.

The supercapacitor 120, as shown in FIG. 4, includes the first electrode 101 formed on the surface of the fiber 100, a plurality of the nanowires 105 formed on the first electrode 101, a second electrode 122 that surrounds the nanowires 105, and an electrolyte 123 that fills a space between the nanowires 105 and the second electrode 122.

The first electrode 101 may include a highly conductive metal material such as Au, but is not limited thereto. The first electrode 101 of the supercapacitor 120 may be electrically connected to the first electrode 101 of the piezoelectric generator 110 and the first electrode 101 of the DSSC 130 so as to form a common electrode. The nanowires 105 may consist of an oxide semiconductor. The nanowires 105 may increase a specific surface area of an electrical double layer in the supercapacitor 120. The nanowires 105 may consist of the same material as that of the nanowires 105 of the piezoelectric generator 110 and the DSSC 130. That is, the nanowires 105 may include a metal oxide or a semiconductor material having piezoelectric characteristics. For example, the nanowires 105 may include ZnO. The nanowires 105 may be formed on the first electrode 101 vertically or inclined at a certain angle, or may be radially arranged on the fiber 100, but are not limited thereto.

The second electrode 122 may surround the nanowires 105. The second electrode 122 may consist of the same material as that of the second electrode 112 of the piezoelectric generator 110 and the second electrode 132 of the DSSC 130 (for example, graphene, CNTs, or metal nanowires). The second electrode 122 may be directly coated or wound in the form of a film on the nanowires 105. The electrolyte 123 may be filled between the nanowires 105 and the second electrode 122. In this regard, the electrolyte 123 may be an electrolyte that is used in a general supercapacitor, for example, a polymer gel electrolyte or a liquid electrolyte such as $KNO_3$ or $H_2SO_4$. The electrolyte 123 filled between the nanowires 105 and the second electrode 122 may be sealed by a sealing member (not shown). When a current is introduced into the supercapacitor 120 having the above-stated structure through the first electrode 101, electric energy may be stored therein.

Figure 7:
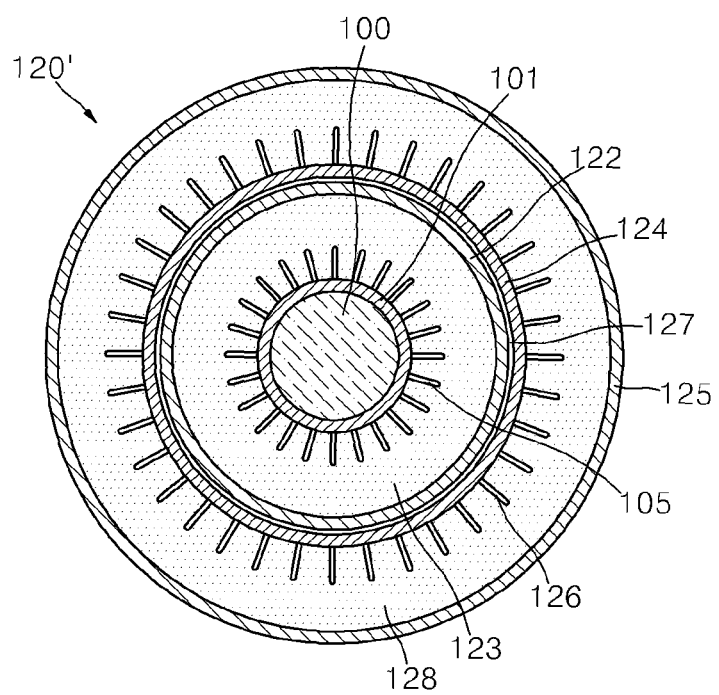
FIG. 7 is a view of a supercapacitor of the apparatus of FIG. 4, according to another exemplary embodiment.

FIG. 7 is a view of a supercapacitor 120' of the apparatus of FIG. 4, having a stacked structure in which two elements are stacked, according to another exemplary embodiment. Referring to FIG. 7, a third electrode 124 surrounds the second electrode 122, nanowires 126 are radially arranged on the third electrode 124, and a fourth electrode 125 surrounds the nanowires 126. An insulating layer 127 may be disposed between the second electrode 122 and the third electrode 124. Although not illustrated in FIG. 7, the second electrode 122 and the third electrode 124 may be integrally formed so as to form a common electrode. In FIG. 7, the supercapacitor 120' having a stacked structure in which two elements are stacked is illustrated. However, the supercapacitor 120' may have a stacked structure in which at least three elements are stacked.

An apparatus for generating and storing electric energy according to one or more exemplary embodiments may be manufactured as follows.

A fiber formed of PMMA having a diameter of approximately 220 μm is used as the fiber 100, and the first electrode 101 is formed to a thickness of about 300 nm by depositing via sputtering an Au layer on the surface of the fiber 100. Nanowires consisting of ZnO are grown on the first electrode 101 by using a general hydrothermal synthesis method. In particular, the fiber 100 with the Au layer deposited thereon is immersed in a mixed solution of hexahydrate and hexamethylenetetramine (HMTA), and a growth temperature and growth time are then set at 80° C. and 18 hours to grow the ZnO nanowires on the Au layer. The grown ZnO nanowires have a diameter of about 500 to about 700 nm and a length of about 6 μm. The second electrodes 112, 122, and 132 are graphene electrodes, and the graphene electrodes are formed by growing graphene on a Cu mesh substrate by CVD. The ZnO nanowires of the DSSC 130 are grown on the graphene electrode by hydrothermal synthesis. A liquid electrolyte containing 0.5 M LiI, 50 mM $I_2$, and 0.5 M 4-terbutylpyridine in 3-methoxypropionitrile is used as the electrolyte 133 included in the DSSC 130, and a 0.5 mM N719 dye solution is used as the photosensitive dye. A $PVA/H_3PO_4$ gel electrolyte is used as the electrolyte 123 of the supercapacitor 120.

Output signals of the piezoelectric generator 110, the DSSC 130, and the supercapacitor 120 of the apparatus manufactured using the method described above are illustrated in FIGS. 8A through 8C, 9, and 10A through 10C, respectively. The results illustrated in FIGS. 8A through 8C, 9, and 10A through 10C show output signals according to operations of the piezoelectric generator 110, the DSSC 130, and the supercapacitor 120, respectively, of the apparatus of FIG. 1.

Figure 8A:
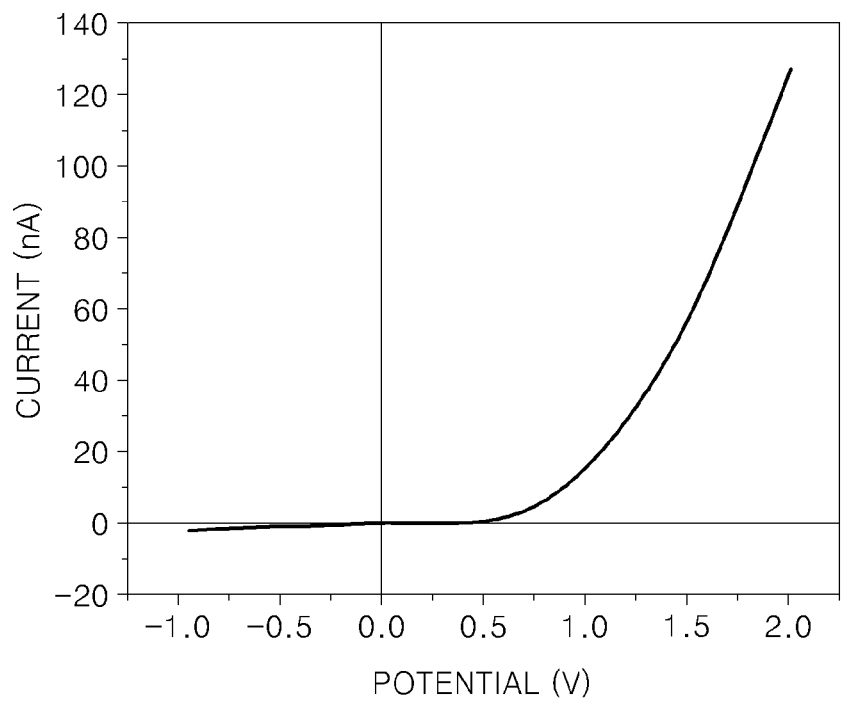
FIGS. 8A through 8C are graphs showing output signals according to an operation of the piezoelectric generator of the apparatus of FIG. 1, according to exemplary embodiments.
Figure 8B:
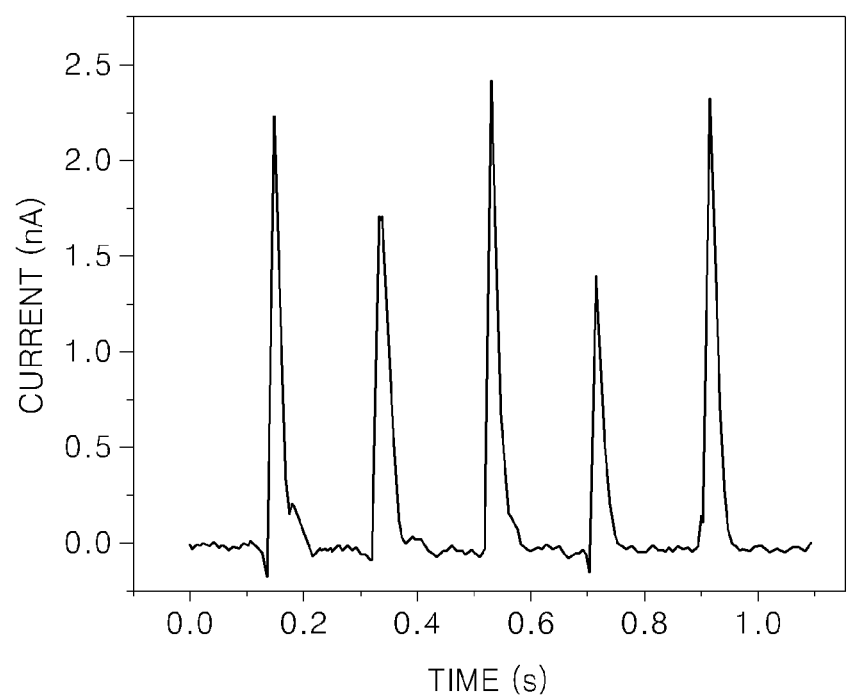
Figure 8C:
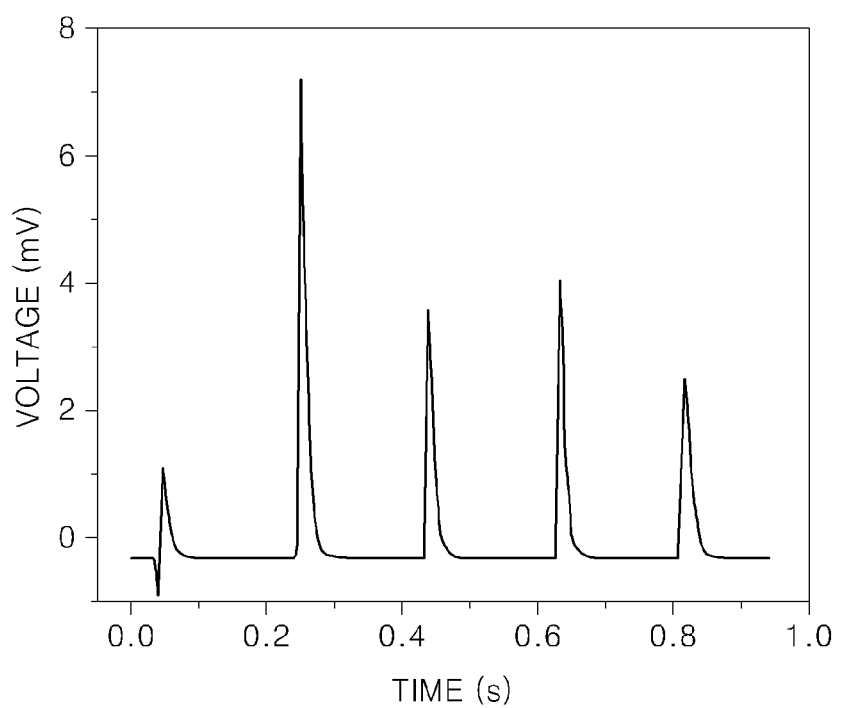

FIGS. 8A through 8C are graphs showing output signals according to an operation of the piezoelectric generator 110 of the apparatus of FIG. 1, according to exemplary embodiments. In particular, FIG. 8A is a curve showing current (I)-voltage (V) characteristics of the piezoelectric generator 110, indicating a Schottky contact between the ZnO nanowires and the graphene electrode. FIG. 8B is a graph showing a short-circuit output current of the piezoelectric generator 110, and FIG. 8C is a graph showing an open-circuit output current of the piezoelectric generator 110. The length of the fiber surrounded by the graphene electrode was approximately 5 mm, and a mechanical signal having a frequency of about 5 Hz was applied to the piezoelectric generator 110. Referring to FIG. 8B, the short-circuit output current, which is a response with respect to mechanical vibration, exhibits sharp current peaks, and a measured maximum short-circuit output current is approximately 2 nA. Referring to FIG. 8, a measured maximum open-circuit output voltage was approximately 7 mV.

Figure 9:
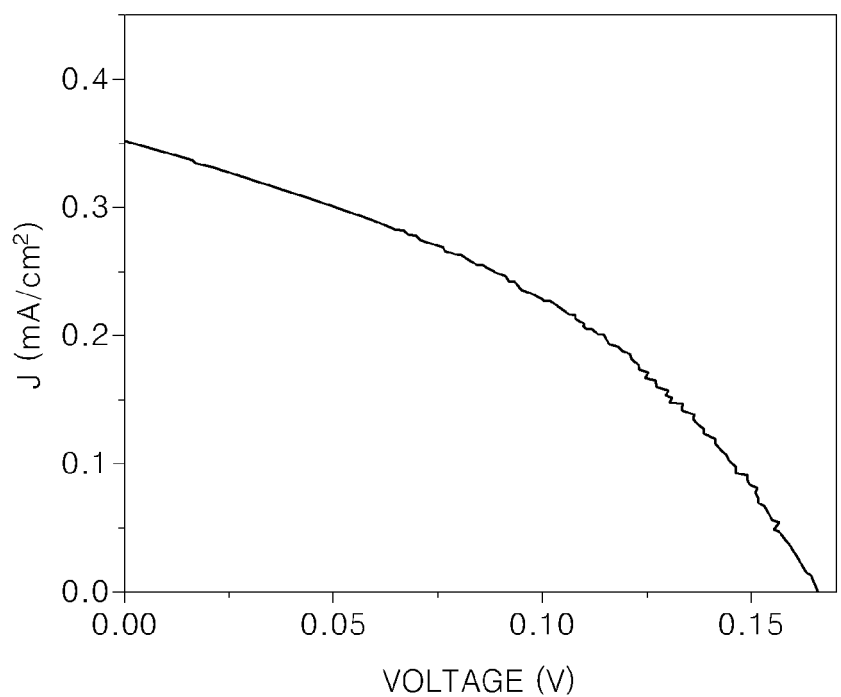
FIG. 9 is a graph showing current density (J)-voltage (V) characteristics according to an operation of the DSSC of the apparatus of FIG. 1, according to an exemplary embodiment.

FIG. 9 is a graph showing current density (J)-voltage (V) characteristics according to an operation of the DSSC 130 of the apparatus illustrated in FIG. 1, according to an exemplary embodiment. The length and effective area of the fiber 100 surrounded by the graphene electrode are 5 mm and 0.035 $cm^2$, respectively. Referring to FIG. 9, a short-circuit current density and an open-circuit voltage are 0.35 $mA/cm^2$ and 0.17 V, respectively, and a fill factor FF is 0.39. Accordingly, the DSSC 130 exhibits an energy conversion efficiency of approximately 0.02%.

Figure 10A:
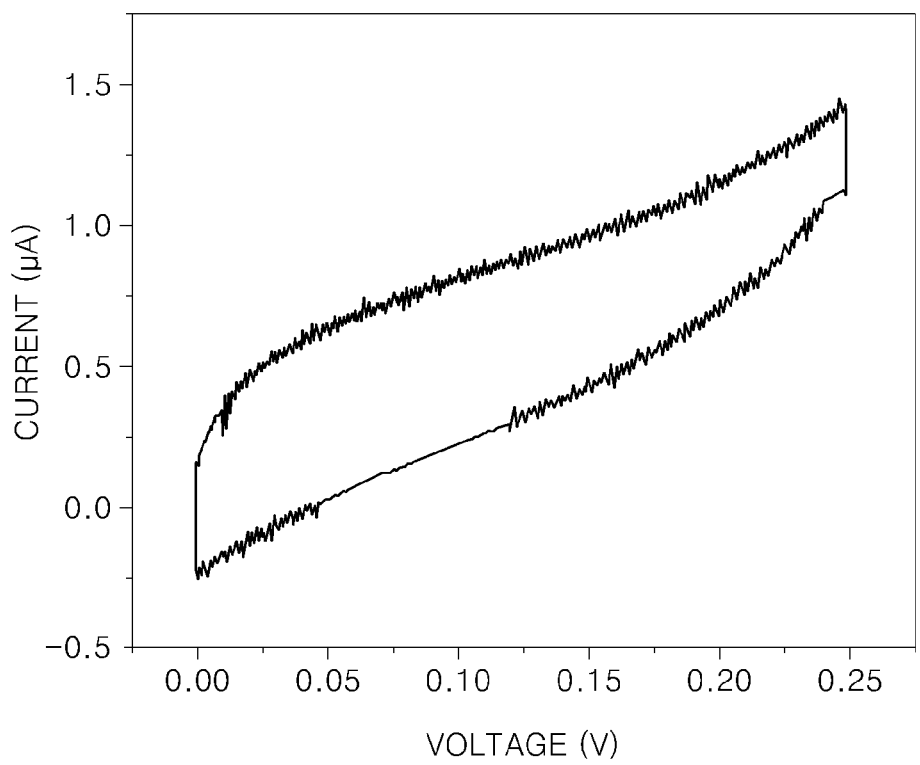
FIGS. 10A through 10C are graphs showing output signals according to an operation of the supercapacitor of the apparatus of FIG. 1, according to an exemplary embodiment.
Figure 10B:
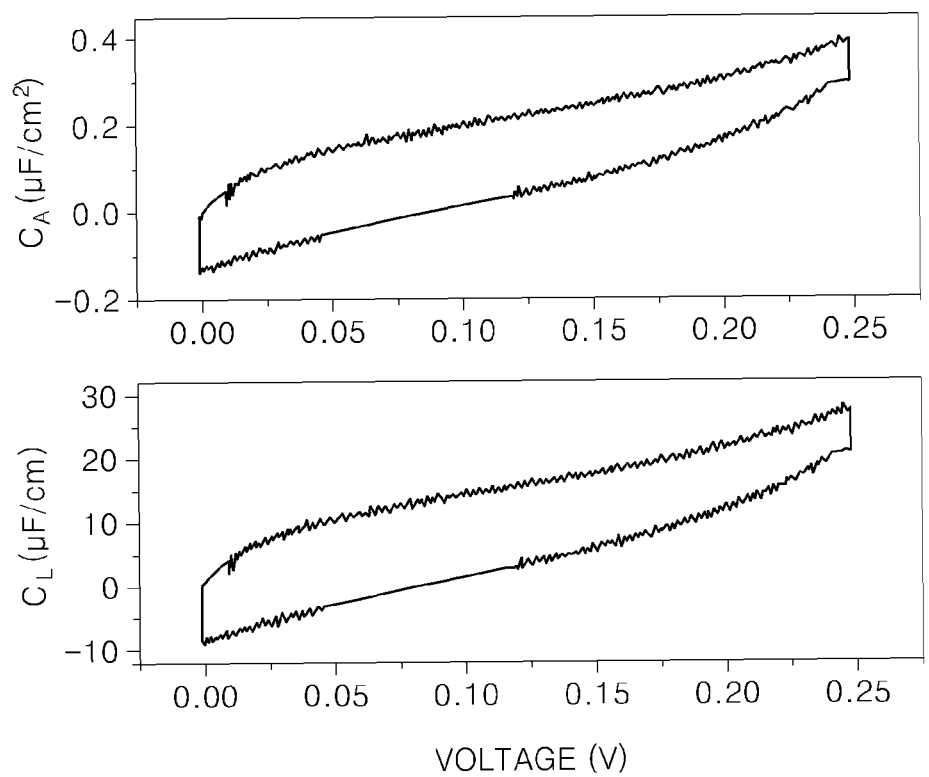
Figure 10C:
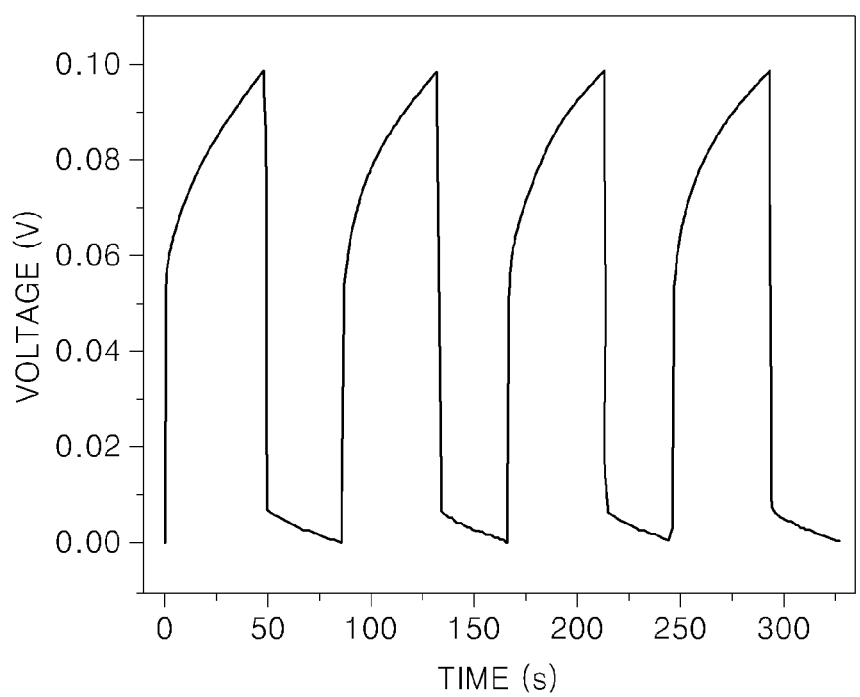

FIGS. 10A through 10C are graphs showing output signals according to an operation of the supercapacitor 120 of the apparatus of FIG. 1, according to exemplary embodiments. In particular, FIG. 10A illustrates cyclic voltammetry of the supercapacitor 120 at a voltage scan rate of 100 mV/s, FIG. 10B illustrates area specific capacitance $C_A$ and length specific capacitance $C_L$ of the supercapacitor 120 at a voltage scan rate of 100 mV/s, and FIG. 10C illustrates a galvanostatic charge-discharge curve at a charge-discharge current of 1 μA. The length and effective area of the fiber 100 surrounded by the graphene electrode are 5 mm and 0.035 $cm^2$, respectively. The cyclic voltammetry of the supercapacitor 120 illustrated in FIG. 10A exhibits relatively good electrochemical stability and capacitance. Referring to FIG. 10B, it is confirmed that the area specific capacitance $C_A$ of the supercapacitor 120 reaches approximately 0.4 $mF/cm^2$, and the length specific capacitance $C_L$ of the supercapacitor 120 reaches approximately 0.025 mF/cm. The galvanostatic charge-discharge curve illustrated in FIG. 10C has a typical triangular shape.

As described above, an apparatus for generating and storing electric energy may have an integrated structure in which the piezoelectric generator 110, the DSSC 130, and the supercapacitor 120 are formed on the fiber 100, which is flexible. The apparatus may easily convert energy generated from the environment into electric energy, and may be manufactured on a nano-scale level by microminiaturization. In addition, an apparatus for generating and storing electric energy having various shapes and consisting of various materials may be manufactured using the flexible fiber 100. That is, an apparatus in which a plurality of the fibers 100 are connected to one another or weaved in the form of fabric may be manufactured. Accordingly, a flexible, stretchable, and multi-functional apparatus for generating and storing electric energy may be manufactured.

In the above-described exemplary embodiments, the electric energy generation unit includes both the piezoelectric generator 110 and the DSSC 130. However, the electric energy generation unit may include one of the piezoelectric generator 110 and the DSSC 130. As illustrated in FIG. 1, the supercapacitor 120 is disposed between the piezoelectric generator 110 and the DSSC 130. However, the supercapacitor 120 may be disposed at another position. In the above-described exemplary embodiments, the first electrode 101 formed on the surface of the fiber 100 is used as a common electrode of the piezoelectric generator 110, the DSSC 130, and the supercapacitor 120. In this case, electric energy (for example, electric energy having a DC signal or a signal converted to DC) generated by the piezoelectric generator 110 or the DSSC 130 may be stored in the supercapacitor 120 through the first electrode 101, which is a common electrode.

Figure 11:
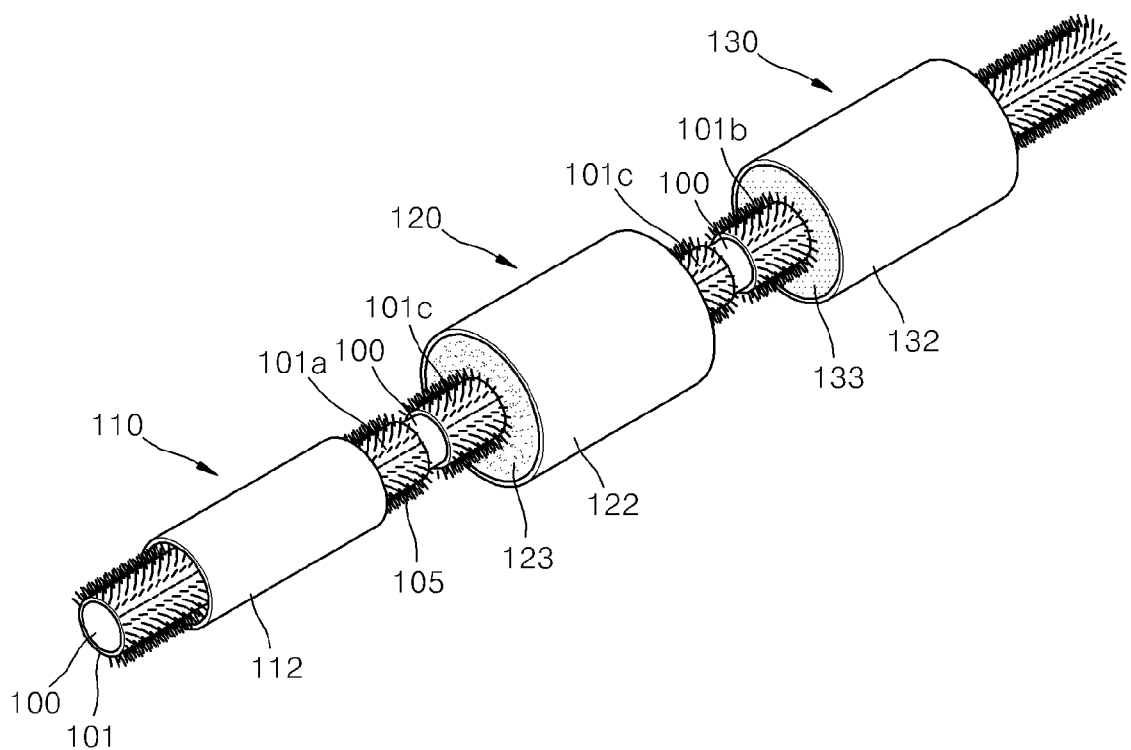
FIG. 11 is a perspective view of an apparatus for generating and storing electric energy, according to an exemplary embodiment.

FIG. 11 is a perspective view of an apparatus for generating and storing electric energy, according to another exemplary embodiment. In the apparatus for generating and storing electric energy of FIG. 11, a first electrode 101a of the piezoelectric generator 110, a first electrode 101b of the DSSC 130, and a first electrode 101c of the supercapacitor 120 may be disconnected from one another. The apparatus of FIG. 11 may be manufactured by disconnecting the piezoelectric generator 110, the DSSC 130, and the supercapacitor 120 of the apparatus of FIG. 1 from one another by etching. In such an apparatus in which the first electrode 101a of the piezoelectric generator 110, the first electrode 101b of the DSSC 130, and the first electrode 101c of the supercapacitor 120 are disconnected from one another, when electric energy generated by the DSSC 130 or the piezoelectric generator 110 has an AC signal, the AC signal may be converted to a DC signal through a rectifier (not shown) and then stored in the supercapacitor 120.

Figure 12:
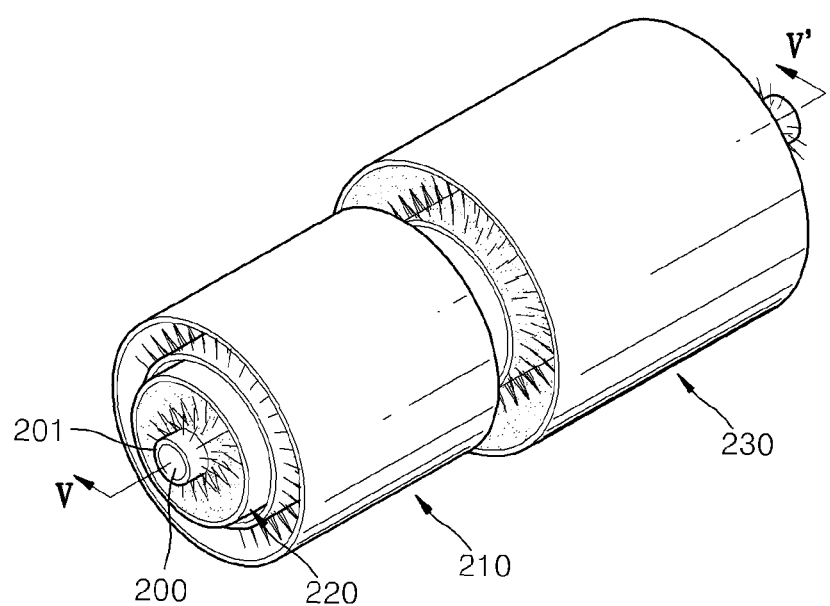
FIG. 12 is a perspective view of an apparatus for generating and storing electric energy, according to an exemplary embodiment.
Figure 13:
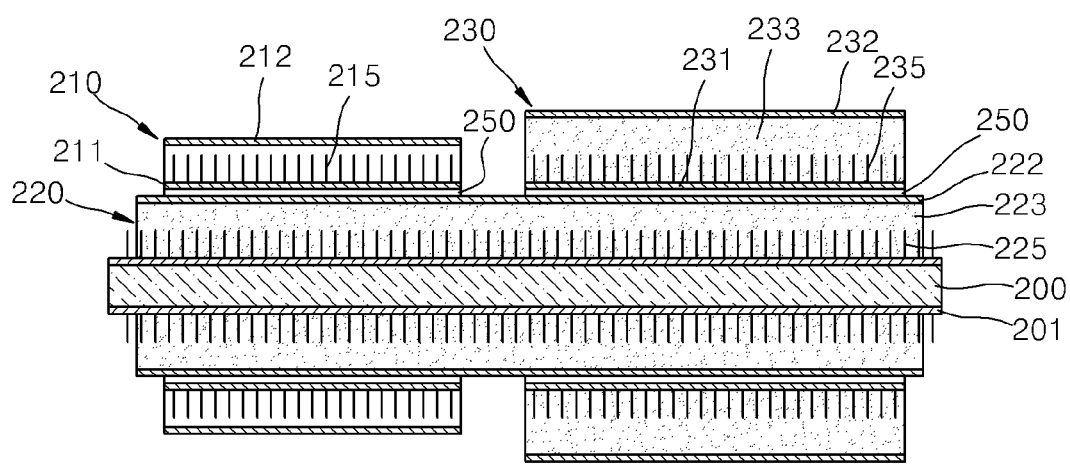
FIG. 13 is a cross-sectional view taken along a line V-V' of FIG. 12, according to an exemplary embodiment.

FIG. 12 is a perspective view of an apparatus for generating and storing electric energy, according to an exemplary embodiment. FIG. 13 is a cross-sectional view taken along a line V-V' of FIG. 12, according to an exemplary embodiment.

Referring to FIGS. 12 and 13, the apparatus includes a fiber 200, an electric energy storage unit disposed on the fiber 200, and an electric energy generation unit disposed on the electric energy storage unit. In this regard, the electric energy storage unit may include a supercapacitor 220, and the electric energy generation unit may include a piezoelectric generator 210 and a DSSC 230.

The supercapacitor 220 includes a first electrode 201 formed on a surface of the fiber 200, a plurality of nanowires 225 formed on the first electrode 201, a second electrode 222 that surrounds the nanowires 225, and an electrolyte 223 filled between the nanowires 225 and the second electrode 222. The fiber 200 may include a flexible material, and the first electrode 201 may include a highly conductive metal material. The nanowires 225 may consist of a metal oxide or a semiconductor material having piezoelectric characteristics, and may be formed on the first electrode 201 vertically or inclined at a certain angle. The nanowires 225 may also be radially arranged on the fiber 200, but are not limited thereto.

The second electrode 222 surrounds the nanowires 225. The second electrode 222 may include, for example, graphene, CNTs, or metal nanowires. The second electrode 222 may be directly coated or wound in the form of a film on the nanowires 225. The electrolyte 223 may be filled between the nanowires 225 and the second electrode 222.

The piezoelectric generator 210 includes a first electrode 211 formed on the second electrode 222 of the supercapacitor 220, a plurality of nanowires 215 formed on the first electrode 211, and a second electrode 212 that surrounds the nanowires 215. The first electrode 211 of the piezoelectric generator 210 may include a highly conductive metal, graphene, CNTs, or metal nanowires. The nanowires 215 may consist of a metal oxide or a semiconductor material having piezoelectric characteristics. The second electrode 212 of the piezoelectric generator 210 may include graphene, CNTs, or metal nanowires. An insulating layer 250 may be disposed between the second electrode 222 of the supercapacitor 220 and the first electrode 211 of the piezoelectric generator 210. Although not illustrated in FIGS. 12 and 13, the second electrode 222 of the supercapacitor 220 and the first electrode 211 of the piezoelectric generator 210 may be integrally formed so as to form a common electrode.

The DSSC 230 includes a first electrode 231 formed on the second electrode 222 of the supercapacitor 220, a plurality of nanowires 235 formed on the first electrode 231, a photosensitive dye disposed between the nanowires 235, a second electrode 232 that surrounds the nanowires 235, and an electrolyte 233 filled between the first electrode 231 and the second electrode 232. The first electrode 231 of the DSSC 230 may include a highly conductive metal, graphene, CNTs, or metal nanowires. The nanowires 235 may consist of a metal oxide or a semiconductor material having piezoelectric characteristics. The second electrode 232 of the DSSC 230 may include graphene, CNTs, or metal nanowires. The photosensitive dye including dye molecules may be disposed between the nanowires 235, and the electrolyte 233 may be filled between the first electrode 231 and the second electrode 232.

In the apparatus having the structure as described above, electric energy generated by each of the piezoelectric generator 210 and the DSSC 230 may be stored in the supercapacitor 220. When electric energy generated by the DSSC 230 or the piezoelectric generator 210 has an AC signal, the AC signal may be converted to a DC signal through a rectifier (not shown) and then stored in the supercapacitor 220. As illustrated in FIGS. 12 and 13, the electric energy generation unit includes the piezoelectric generator 210 and the DSSC 230. However, the electric energy generation unit may include only one of the piezoelectric generator 210 and the DSSC 230.

As described above, according to the one or more exemplary embodiments, an apparatus for generating and storing electric energy includes a structure in which an electric energy generation unit and an electric energy storage unit are integrally formed on a flexible fiber, and thus may easily convert energy generated from the environment into electric energy and be manufactured on a nano-scale level by microminiaturization. In addition, an apparatus for generating and storing electric energy that has various shapes and consists of various materials may be manufactured using the flexible fiber.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An apparatus for generating and storing electric energy, the apparatus comprising:
    a fiber;
    an electric energy generation unit disposed around the fiber; and
    an electric energy storage unit which is disposed around the fiber and includes a supercapacitor,
    wherein the supercapacitor comprises a first electrode formed on a surface of the fiber, a plurality of nanowires formed on the first electrode, a second electrode that surrounds the plurality of nanowires, and an electrolyte that fills a space between the plurality of nanowires and the second electrode.

2. The apparatus of claim 1, wherein the electric energy generation unit comprises at least one of a piezoelectric generator and a dye-sensitized solar cell (DSSC).

3. The apparatus of claim 2, wherein the piezoelectric generator comprises a first electrode formed on a surface of the fiber, a plurality of nanowires formed on the first electrode, and a second electrode that surrounds the nanowires.

4. The apparatus of claim 3, wherein an end of each of the plurality of nanowires of the piezoelectric generator forms a Schottky contact with the second electrode.

5. The apparatus of claim 3, wherein the piezoelectric generator further comprises a third electrode formed on the second electrode, a plurality of nanowires formed on the third electrode, and a fourth electrode that surrounds the nanowires.

6. The apparatus of claim 2, wherein the DSSC comprises a first electrode formed on the surface of the fiber, a plurality of nanowires formed on the first electrode, a photosensitive dye disposed between the plurality of nanowires, a second electrode that surrounds the nanowires, and an electrolyte that fills a space between the first electrode and the second electrode.

7. The apparatus of claim 6, wherein a plurality of nanowires are formed between the first electrode and the second electrode.

8. The apparatus of claim 6, wherein the DSSC further comprises a third electrode formed on the second electrode, a plurality of nanowires formed on the third electrode, a photosensitive dye disposed between the plurality of nanowires, a fourth electrode that surrounds the plurality of nanowires, and an electrolyte that fills a space between the third electrode and the fourth electrode.

9. The apparatus of claim 1, wherein the supercapacitor further comprises a third electrode formed on the second electrode, a plurality of nanowires formed on the third electrode, a fourth electrode that surrounds the plurality of nanowires, and an electrolyte that fills a space between the plurality of nanowires and the fourth electrode.

10. The apparatus of claim 9, wherein the first electrode of the piezoelectric generator, the first electrode of the DSSC, and the first electrode of the supercapacitor are electrically connected to one another so as to form a common electrode.

11. The apparatus of claim 9, wherein the first electrode of the piezoelectric generator, the first electrode of the DSSC, and the first electrode of the supercapacitor are electrically disconnected from one another.

12. The apparatus of claim 9, wherein the first electrode of the piezoelectric generator, the first electrode of the DSSC, and the first electrode of the supercapacitor each comprise a metal material.

13. The apparatus of claim 9, wherein the second electrode of the piezoelectric generator, the second electrode of the DSSC, and the second electrode of the supercapacitor each comprise one of graphene, carbon nanotubes (CNTs), and metal nanowires.

14. The apparatus of claim 9, wherein each of the second electrode of the piezoelectric generator, the second electrode of the DSSC, and the second electrode of the supercapacitor is directly coated over or wound in the form of a film around the plurality of nanowires.

15. The apparatus of claim 9, wherein the plurality of nanowires comprise a metal oxide or a semiconductor material having piezoelectric characteristics.

16. The apparatus of claim 9, wherein the plurality of nanowires are radially arranged.

17. The apparatus of claim 1, wherein the fiber comprises a flexible material.

18. The apparatus of claim 1, wherein a plurality of the fibers are connected to one another or weaved in the form of fabric.

19. An apparatus for generating and storing electric energy, the apparatus comprising:
    a fiber;
    an electric energy storage unit which is disposed around the fiber and includes a supercapacitor; and
    an electric energy generation unit disposed around the electric energy storage unit,
    wherein the supercapacitor comprises a first electrode formed on a surface of the fiber, a plurality of nanowires formed on the first electrode, a second electrode that surrounds the nanowires, and an electrolyte that fills a space between the plurality of nanowires and the second electrode.

20. The apparatus of claim 19, wherein the electric energy generation unit comprises at least one of a piezoelectric generator and a dye-sensitized solar cell (DSSC).

21. The apparatus of claim 20, wherein the piezoelectric generator comprises a first electrode formed on the second electrode of the supercapacitor, a plurality of nanowires formed on the first electrode, and a second electrode that surrounds the plurality of nanowires.

22. The apparatus of claim 20, wherein the DSSC comprises a first electrode formed on the second electrode of the supercapacitor, a plurality of nanowires formed on the first electrode, a photosensitive dye disposed between the plurality of nanowires, a second electrode that surrounds the plurality of nanowires, and an electrolyte that fills a space between the first electrode and the second electrode.

23. An apparatus for generating and storing electricity, the apparatus comprising:
    a flexible fiber;
    an electric energy generation unit; and
    a supercapacitor comprising a first electrode formed around the fiber, a first plurality of nanowires formed on the first electrode, a second electrode formed around the plurality of nanowires, and an electrolyte that fills a space between the plurality of nanowires and the second electrode.

24. The apparatus of claim 23, wherein the electric energy generation unit comprises a piezoelectric generator comprising:
    a third electrode formed around the fiber, a second plurality of nanowires formed on the third electrode, and a fourth electrode that surrounds the second plurality of nanowires, wherein an end of each of the second plurality of nanowires forms a Schottky contact with the fourth electrode.

25. The apparatus of claim 24, wherein the first electrode and the third electrode are electrically connected, this forming a common electrode.

26. The apparatus of claim 23, wherein the electric energy generation unit comprises a dye-sensitized solar cell (DSSC) comprising:
    a third electrode formed around the fiber, a second plurality of nanowires formed on the third electrode, a photosensitive dye disposed between the second plurality of nanowires, a fourth electrode that surrounds the second plurality of nanowires, and an electrolyte that fills a space between the third electrode and the fourth electrode.

27. The apparatus of claim 26, wherein the first electrode and the third electrode are electrically connected, this forming a common electrode.

* * * * *